Figure 1:
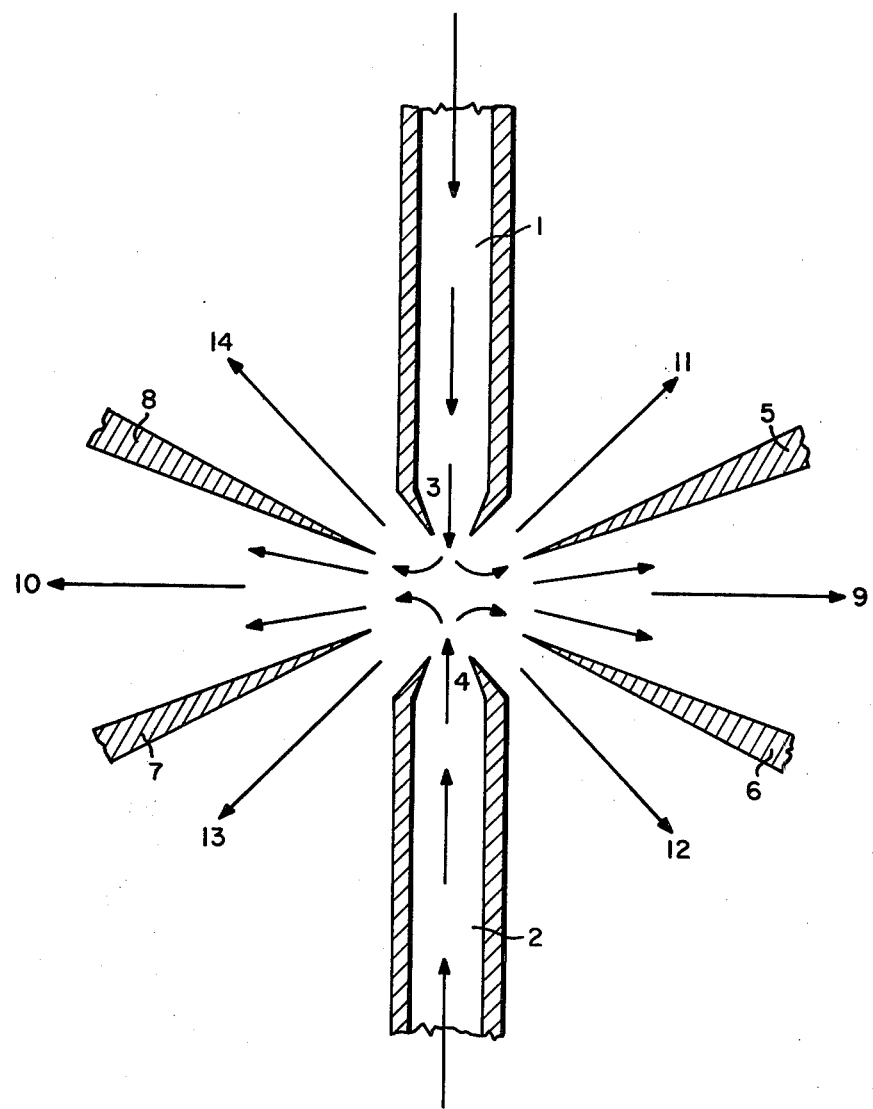

United States Patent [19]

Anderson

[11] 4,141,699

[45] Feb. 27, 1979

[54] PROCESS FOR SEPARATING GAS MIXTURES, ESPECIALLY ISOTOPES

[76] Inventor: James B. Anderson, 743 Glenn Rd., State College, Pa. 16801

[21] Appl. No.: 457,370

[22] Filed: Apr. 2, 1974

[51] Int. Cl.² ............................................. B01D 57/00
[52] U.S. Cl. ............................................ 55/17; 55/72; 55/342; 55/419; 55/434
[58] Field of Search ..................... 55/17, 72, 277, 392, 55/342, 419, 434

[56] References Cited

U.S. PATENT DOCUMENTS

| | | | |
|---|---|---|---|
| 3,443,087 | 5/1969 | Robieux et al. | 55/2 X |
| 3,558,877 | 1/1971 | Pressman | 55/2 X |

Primary Examiner—Stephen J. Lechert, Jr.

[57] ABSTRACT

A process is disclosed for the separation of the components of a gaseous mixture which makes use of two nozzles, through which the mixture is caused to flow, placed in opposition to each other in a manner as to produce curvature of the flow of the interacting jets. Under the conditions of high velocity and streamline curvature the induced pressure gradients cause the preferential migration of one or more components of the gaseous mixture with respect to the others. The spatially separated components are removed in separate streams from the region of the interacting jets.

6 Claims, 1 Drawing Figure

PROCESS FOR SEPARATING GAS MIXTURES, ESPECIALLY ISOTOPES

The present invention relates to a process for the separation of gas mixtures, especially those of isotopes, including uranium isotopes, i.e. $U^{235}F_6$ and $U^{238}F_6$. The invention is concerned with providing a process for the economical separation of such mixtures, maximizing the amount of separative work which can be obtained in relation to the total amount of energy expended in accomplishing the separation.

The separation of the components of a mixture of gases and, more particularly, the separation of uranium isotopes have presented difficulties for many years. Although separation can be achieved by a number of methods, including centrifugation, differential diffusion through porous barriers, use of the effects of thermal gradients, differential adsorption, pressure diffusion in flow along a curved wall, impingement of a jet on a sampling probe, and placing an array of probes in a supersonic stream, each of these methods has proved relatively inefficient and costly.

According to the invention it was discovered that the above-mentioned disadvantages can be avoided and that a given amount of separative work can be obtained for a lower expenditure of energy by causing two supersonic jets of the gas mixture to be separated to impinge on one another in a manner as to cause curvature of the flow of the two jets. Under the conditions of high velocity and streamline curvature the effect of the pressure gradient induced is to cause a preferential migration of one of the species with respect to the other. The jet flows are arranged such that the spatially separated species are removed in separate streams from the region of the interacting jets.

The accompanying drawing, FIG. 1, shows one embodiment of apparatus suitable for use with the process according to the invention.

With reference to the drawing, flows of the gas mixture to be separated are provided through ducts 1 and 2 to nozzles 3 and 4 of circular cross-section from which the streams emerge, expanding into supersonic flow into the region between the two nozzles. The two gas streams impinge on each other in that region and are forced by their interaction in an outward radial direction toward cone-shaped separating vanes 5, 6, 7 and 8. The heavier or smaller components of the mixture are forced by pressure diffusion toward the higher pressure regions of the flow exhausting between the vanes 5 and 6 as stream 9 and between vanes 7 and 8 as stream 10. The lighter or larger components exhaust on the other sides of vanes 5, 6, 7 and 8 as streams 11, 12, 13 and 14. The gas exiting as streams 9 and 10 is thus enriched in the heavier or smaller components of the mixture with respect to the gas exiting as streams 11, 12, 13 and 14.

The gas mixture to be separated is supplied from a compressor (not shown) to the ducts 1 and 2 feeding the nozzles. The separated gas streams flowing past the vanes as streams 9 through 14 are removed via ducts (not shown) connected to pumps (not shown). A reduced pressure is maintained in the region of the vanes by the suction of these pumps. Separating units, consisting of nozzles, vanes, ducts and pumps may be interconnected in a cascade system to enhance the overall extent of separation.

The extent of separation in each process unit depends on the coefficients of pressure diffusion for the species present and the gradients of the pressure within the interacting jets. These are in turn dependent on the masses and sizes of the molecules of the mixture and the pressures maintained at the various points within the system.

The energy requirements of the process per unit of separative work achieved are dependent upon the work which must be performed in compressing the gas streams. This is a function of the pressure ratios between inlet and exit streams. The process has the advantage that the pressure ratios between the inlets to the nozzles and the exits at the vanes may be as low or lower than three-to-one while maintaining a high degree of separation.

The efficiency of the process is in part due to the high degree of curvature of the supersonic jet flows, which are turned ninety degrees or more. The high jet velocities are obtained in the absence of confining walls thereby eliminating the deleterious effects of friction with such confining walls.

In some cases it is advantageous to accelerate the supersonic flows by the addition of a light gas to the mixture entering the nozzles. The higher velocities obtained enhance the separation effect by increasing the driving forces for pressure diffusion.

The process may be carried out by the use of a two-dimensional or slit configuration for the nozzles and separating vanes. A plurality of nozzles of circular, slit or other cross-sectional shape may be combined in a single process unit.

EXAMPLE

A mixture containing 0.70 parts $U^{235}F_6$ and 99.30 parts $U^{238}F_6$ is compressed to a pressure of 0.100 p.s.i.a. and supplied to two nozzles having exit diameters of 0.1 cm, placed on a common axis 0.2 cm apart. The separating vanes are placed in approximately the positions shown in FIG. 1. The pressure in the region of the vanes is maintained at 0.030 p.s.i.a. The gas streams exhausting as streams 9 and 10 contain 0.33 parts $U^{235}F_6$ and 49.67 parts $U^{238}F_6$ while the gas streams exhausting as streams 11 through 14 contain 0.37 parts $U^{235}F_6$ and 49.63 parts $U^{238}F_6$.

I claim:

1. A process for the separation of the components of a gaseous mixture which comprises:
   (a) passing said mixture from high pressure regions through two separate nozzles into a lower pressure region,
   (b) placing the nozzles in opposition to each other, with an angle of 160 degrees to 200 degrees between their flow directions, such that the nozzles flows impinge on one another, and
   (c) withdrawing the components of said mixture as two or more streams from the region of the interaction of the two supersonic flows, each stream enriched in one or more of the components of the original mixture with respect to the other components.

2. The process of claim 1 wherein the gaseous mixture to be separated contains isotopes of uranium.

3. The process of claim 1 wherein the mixture to be separated contains $U^{235}F_6$ and $U^{238}F_6$.

4. The process of claim 1 wherein a light gas is added to the mixture to be separated.

5. The process of claim 1 wherein a cascade of separation units is employed.

6. The process of claim 1 wherein a plurality of nozzles is employed.

* * * * *